(12) United States Patent
Matsubara

(10) Patent No.: US 7,176,814 B2
(45) Date of Patent: Feb. 13, 2007

(54) INFORMATION TRANSMITTING DEVICE

(75) Inventor: Masaki Matsubara, Tokyo-ku (JP)

(73) Assignee: Wacom Co., Ltd., Saitama-ken (JP)

( * ) Notice: Subject to any disclaimer, the term of this patent is extended or adjusted under 35 U.S.C. 154(b) by 0 days.

(21) Appl. No.: 11/176,679

(22) Filed: Jul. 8, 2005

(65) Prior Publication Data

US 2006/0007033 A1    Jan. 12, 2006

(30) Foreign Application Priority Data

Jul. 9, 2004   (JP)   ............... 2004-203578

(51) Int. Cl.
H03M 1/22 (2006.01)
G06F 3/033 (2006.01)
(52) U.S. Cl. ...................... 341/5; 178/19.01
(58) Field of Classification Search ............ 178/19.03, 178/19.04, 19.06; 345/179; 341/5, 97, 98
See application file for complete search history.

(56) References Cited

U.S. PATENT DOCUMENTS 5,706,000 A * 1/1998 Fukuzaki et al. ............. 341/5
5,952,999 A * 9/1999 Makinwa ................... 345/173

FOREIGN PATENT DOCUMENTS

| JP | 01296712 A | * | 11/1989 |
| JP | 07175572 A | * | 7/1995 |
| JP | 09244589 A | * | 9/1997 |
| JP | 2005182608 A | * | 7/2005 |

* cited by examiner

Primary Examiner—Howard L. Williams
(74) Attorney, Agent, or Firm—Berenato, White & Stavish, LLC

(57) ABSTRACT

In an information transmitting device, a variable capacitor which is charged to have a predetermined voltage discharges through a predetermined resistor. Until the voltage becomes lower than a predetermined threshold voltage, the number of AC signals having a predetermined frequency is counted. Accordingly, first continuous amount information of a binary code corresponding to a writing pressure is obtained and is converted to a Gray code, which is regarded as second continuous amount information. A resonant circuit is opened or shorted in accordance with '0' or '1' in the second continuous amount information, so as to transmit the second continuous amount information.

5 Claims, 3 Drawing Sheets a: SIGNAL FROM TABLET b: SIGNAL OF RESONANT CIRCUIT c: OUTPUT FROM DETECTOR CIRCUIT d: OUTPUT FROM INTEGRATOR CIRCUIT e: WRITING PRESSURE DETECTING CIRCUIT f: SWITCH CONTROL

THRESHOLD

Fig. 3

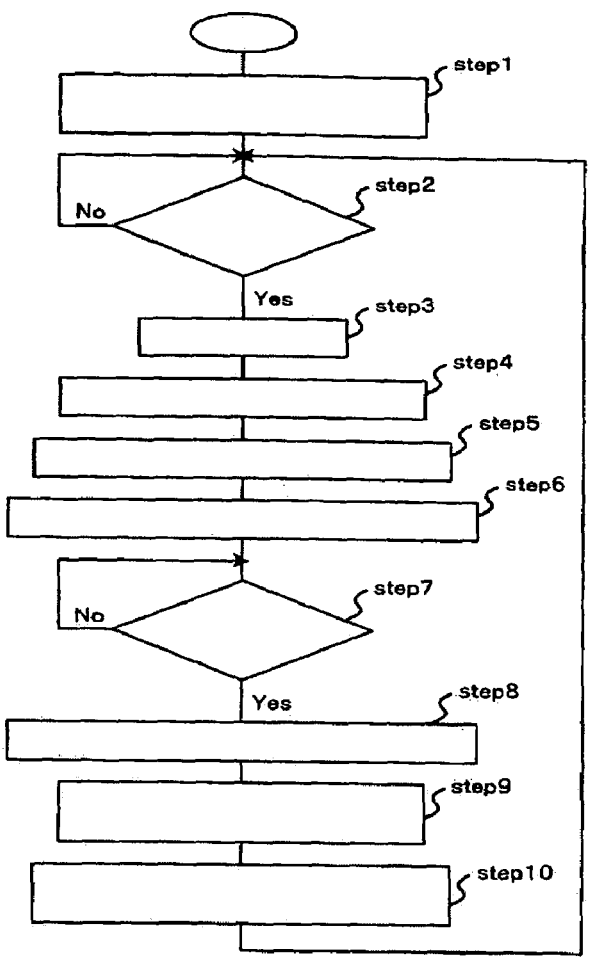

FIG. 3

START

STEP 1: INITIAL SETTINGS

P0, P1, AND P4: INPUT    P3: OUTPUT

STEP 2: HAS RISING EDGE OF SIGNAL FROM TERMINAL P1 BEEN DETECTED?

STEP 3: CLEARS COUNTER

STEP 4: SETS TERMINAL P2 TO HIGH-LEVEL OUTPUT

STEP 5: SETS TERMINAL P2 TO INPUT SIDE AND MONITORS VOLTAGE

STEP 6: STARTS TO COUNT NUMBER OF SIGNALS INPUT FROM P4

STEP 7: VOLTAGE < THRESHOLD?

STEP 8: STOPS COUNTER AND STORES COUNTER VALUE AS CONTINUOUS AMOUNT INFORMATION A

STEP 9: CONVERTS CONTINUOUS AMOUNT INFORMATION A TO GRAY CODE AND STORES IT AS CONTINUOUS AMOUNT INFORMATION B

STEP 10: CONTROLS TERMINAL P3 IN ACCORDANCE WITH BIT OF CONTINUOUS AMOUNT INFORMATION B IN SYNCHRONIZATION WITH RISING EDGE OF SIGNAL FROM TERMINAL P0

INFORMATION TRANSMITTING DEVICE

CROSS-REFERENCE TO RELATED APPLICATIONS AND CLAIM TO PRIORITY

This application is based upon application number 2004-203578, filed Jul. 9, 2004, in Japan, the disclosure of which is incorporated by reference and to which priority is claimed.

FIELD OF THE INVENTION

The present invention relates to a device for transmitting digital information in response to externally transmitted electromagnetic waves.

BACKGROUND OF THE INVENTION

Hitherto, devices for receiving externally transmitted electromagnetic waves, generating electromagnetic waves which include digital information indicating status of the device and digital information held (stored) therein, and externally transmitting the information have been known (hereinafter these devices are called "information transmitting devices").

One example of these devices is a wireless position indicator used in an electromagnetic induction type digitizer (see Japanese Unexamined Patent Application Publication Nos. 3-189716 and 7-175572).

The above-mentioned position indicators include a resonant circuit tuning with externally transmitted electromagnetic waves; a digital information generator for generating digital information including a binary code of 2 bits or more, the digital information corresponding to an operation and/or being stored in a memory or the like in advance; and a resonance characteristic controller for changing a characteristic of the resonant circuit in accordance with any one of '0' and '1' of the binary code in synchronization with at least part of the electromagnetic waves. By allowing an information receiver side to recognize the change in the characteristic of the resonant circuit, digital information is transmitted.

Further, in this type of information transmitting device, by providing a power extracting unit for extracting power for driving each component, that is, the digital information generator and the resonance characteristic controller, from an induced voltage which is generated in the resonant circuit due to externally transmitted electromagnetic waves, a power supply such as a battery is not necessary.

The above-described resonance characteristic controllers may be classified into two types. In one of them, an element is connected to an element of the resonant circuit in accordance with any one of '0' and '1' of a binary code so as to change frequencies of transmitted electromagnetic waves. In the other, by shorting across an element of the resonant circuit in accordance with any one of '0' and '1' of a binary code, electromagnetic waves are generated (ON-state) or not generated (OFF-state).

The latter resonance characteristic controller has the following advantages. That is, an element other than an element of the resonant circuit is unnecessary, an information receiver side should detect only a reception signal level at predetermined timing, and detection of a change in frequencies of electromagnetic waves, which needs a filter and a phase detector, need not be performed.

On the other hand, the latter resonance characteristic controller has the following problem. That is, power cannot be extracted from the resonant circuit while the resonant circuit is shorted, and thus a power supply voltage supplied from the power extracting unit to each component is likely to become unstable.

In particular, when the digital information generator is configured to detect analog information corresponding to an operation represented by a continuous amount, such as a writing pressure, and then to convert the analog information to digital information (binary code), a digit of the binary code increases or decreases in accordance with changes in analog information. If '0' or '1' in a code significantly varies, the power supply voltage becomes very unstable. Accordingly, analog information cannot be stably detected and detection accuracy decreases.

SUMMARY OF THE INVENTION

An object of the present invention is to provide an information transmitting device capable of stably detecting analog information and transmitting corresponding digital information without using a relatively stable independent power supply, such as a battery.

In order to achieve the above-described object, an information transmitting device of the present invention includes: a resonant circuit; a power extracting unit for extracting a power for driving each component from an induced voltage which is generated in the resonant circuit due to externally transmitted electromagnetic waves; a digital information generator for detecting analog information and generating digital information which corresponds to the analog information and which includes a binary code of two bits or more; and a resonance characteristic controller for bringing the resonant circuit into a short-circuited state in accordance with any one of '0' and '1' of the binary code in synchronization with at least part of the electromagnetic waves. By transmitting the digital information including the binary code, only one bit of the binary code changes when the corresponding analog information changes, a variation in a power supply voltage is suppressed and the analog information can be stably detected.

With this configuration, when analog information to be detected changes and corresponding digital information also changes, the difference in the digital information is always only one bit value. In other words, only one '0' in a code changes to '1' or only one '1' in a code changes to '0'. Therefore, a power supply voltage supplied from the power extracting unit to each component can be relatively stabled.

Preferably, a "Gray code" may be used as a binary code. Table 1 shows 4-bit Gray codes together with typical binary codes.

TABLE 1

| Decimal number | Binary code | Gray code |
| --- | --- | --- |
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

As can be understood from Table 1, when a Gray code continuously changes, only one bit in the code changes at each time. In this way, each bit '0' or '1' does not significantly vary unlike an increase or decrease in a digit of a binary code.

The digital information generator may include a coding unit for converting the analog information to binary code; and a code converting unit for converting the binary code to a Gray code.

The coding unit converts the analog information to a time period and generates a binary code by counting AC signals having a predetermined frequency during the time period.

As described above, according to the present invention, digital information can be transmitted in response to externally transmitted electromagnetic waves without using a relatively stable independent power supply, such as a battery, and analog information can be stably detected.

BRIEF DESCRIPTION OF THE DRAWINGS

FIG. 3 is a flowchart illustrating operation of the embodiment of FIG. 1.

DESCRIPTION OF THE PREFERRED EMBODIMENT(s)

Figure 1:
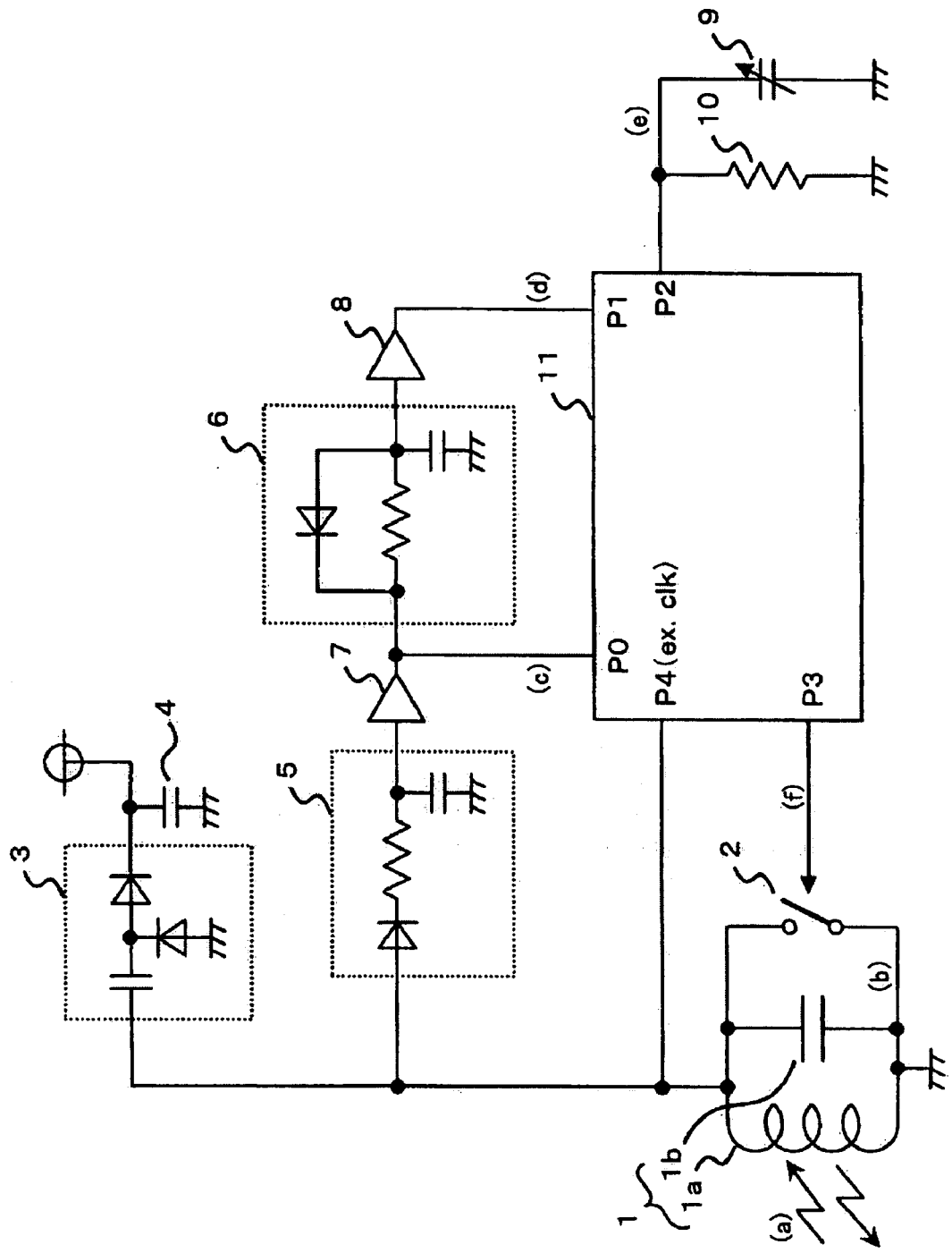
FIG. 1 shows an example of a configuration of an information transmitting device according to an embodiment of the present invention.

FIG. 1 shows an example of an information transmitting device according to an embodiment of the present invention. Herein, a position indicator for a digitizer is used as the information transmitting device. In FIG. 1, the information transmitting device includes a resonant circuit 1; a switch 2; a power extracting circuit 3; a power supply capacitor 4; a detector circuit 5; an integrator circuit 6; buffers 7 and 8; a variable capacitor 9; a resistor 10; and a microcomputer 11.

The resonant circuit 1 includes a coil 1a and a capacitor 1b and has a resonance frequency that is almost the same as a frequency of electromagnetic waves transmitted from a tablet (not shown). The switch 2 is turned ON/OFF under control of the microcomputer 11 so as to change a characteristic of the resonant circuit 1 by opening or shorting across the capacitor 1b. In this case, the switch 2 brings the resonant circuit 1 into an operating state or a non-operating state to transmit or interrupt a signal to the tablet side. The power extracting circuit 3 rectifies an AC induced voltage generated in the resonant circuit 1 and accumulates it in the power supply capacitor 4, so as to supply a power to the buffers 7 and 8 and the microcomputer 11.

The detector circuit 5 and the buffer 7 supply pulse signals in accordance with (an envelope component of) signals generated in the resonant circuit 1 due to electromagnetic waves from the tablet to the integrator circuit 6 and the microcomputer 11. The integrator circuit 6 and the buffer 8 generate an output only when signals from the detector circuit 5 and the buffer 7 continue over a predetermined time period and supply the signals to the microcomputer 11.

Capacitance of the variable capacitor 9 continuously changes in accordance with analog information to be detected, such as writing pressure of the position indicator. The resistor 10 is connected across the variable capacitor 9. The variable capacitor 9 and the resistor 10 form a time constant circuit for converting writing pressure of the position indicator, that is, analog information, to a time period.

A microcomputer is used as the microcomputer 11, which includes a ROM (read only memory) and a RAM (random access memory) and which operates according to a program written in the ROM.

Typically, the microcomputer includes a plurality of input/output terminals, any of which can be arbitrarily set in accordance with a program written in the ROM. In this embodiment, five input/output terminals among all of the terminals in the microcomputer 11 are used, as shown in FIG. 1.

Specifically, a terminal P0 serves as an input terminal and supplies signals from the buffer 7. Also, a terminal P1 serves as an input terminal and supplies signals from the buffer 8. A terminal P2 connects to the variable capacitor 9 and serves as an output terminal to charge the variable capacitor 9. At the same time, the terminal P2 serves as an input terminal to detect the voltage of the variable capacitor 9 (time constant circuit). A terminal P3 serves as an output terminal and connects to the switch 2 so as to turn ON/OFF the switch 2. A terminal P4 (ex. clk) serves as an input terminal and connects to the resonant circuit 1 so as to count the number of waves of signals transmitted from the tablet obtained from the resonant circuit 1 by using a timer (counter) incorporated therein.

Figure 2:
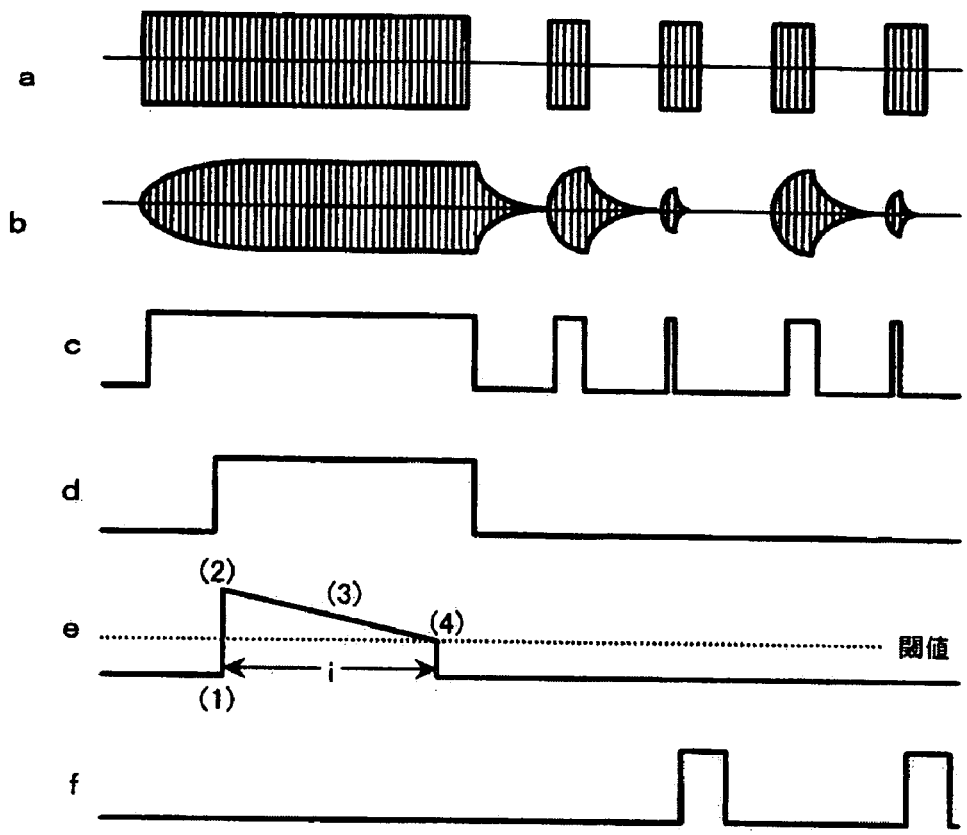
FIG. 2 is a waveform chart illustrating operation of the embodiment of FIG. 1.

Next, an outline of an operation performed by the above-described device is described. FIG. 2 shows an operation according to the embodiment of FIG. 1 and 'a' to 'f' in FIG. 2 indicate signal waveforms which are transmitted through portions denoted by the same reference symbols shown in FIG. 1.

In order to detect operation information of the position indicator represented by a continuous amount, electromagnetic waves are transmitted from the tablet with the timing indicated by 'a' in FIG. 2. That is, after a long-time transmission of about 500 µs (hereinafter called a burst) and a transmission stop period of about 100 µs, a short-time transmission of about 50 µs (hereinafter called a synchronization signal) and a transmission stop period of about 100 µs (receiving period in the tablet) are repeated. At the plurality of (in this case four) short synchronization signal transmitting timings after the burst, the tablet side detects 4-bit digital information, as described later.

FIG. 3 shows an operation flowchart corresponding to the program executed by the microcomputer 11 according to the embodiment. Hereinafter, the operation is described with reference to this flowchart.

The microcomputer 11 is in a low-power-consumption state (sleeping state) while stopping a clock during a non-operating mode, so as to minimize power consumption.

When the position indicator shown in FIG. 1 is placed onto the tablet, the tablet generates a signal, which generates a signal in the resonant circuit 1. With this signal, the power supply capacitor 4 becomes charged, and then the microcomputer 11 starts to operate upon reaching a predetermined voltage. First, the microcomputer 11 sets the terminals P0, P1, and P4 to an input side and sets the terminal P3 to an output side (STEP 1). Then, the microcomputer 11 detects a rising edge (burst) of a signal from the terminal P1 (STEP 2) and starts a process of detecting writing pressure (a continuous amount).

The microcomputer 11 clears the counter (STEP 3) and sets the terminal P2 to a high-level output (STEP 4), so as to charge the variable capacitor 9 until reaching a predetermined voltage ((1) and (2) of 'e' in FIG. 2).

Then, the microcomputer 11 sets the terminal P2 to an input side and starts to monitor the voltage (STEP 5). At the same, the microcomputer 11 starts to count the number of waves of transmission signals input from the terminal P4 by using the counter (STEP 6). When the terminal P2 is set to the input side, an electric charge accumulated in the variable capacitor 9 is discharged through the resistor 10, so that a terminal voltage gradually decreases in accordance with the discharge ((3) of 'e' in FIG. 2).

After determining that the terminal voltage becomes below a predetermined voltage or threshold in STEP 7 ((4) of 'e' in. FIG. 2), the microcomputer 11 stops the counter and stores a counter value at that time as a continuous amount information A (STEP 8).

A time period 'i' until the voltage of the terminal P2 becomes lower than the threshold due to discharge changes depending on the capacitance of the variable capacitor 9, that is an applied writing pressure. Therefore, the counter value corresponding to the time 'i', that is, the continuous amount information A, can be regarded as binary-coded writing pressure.

After detecting writing pressure, the microcomputer 11 converts the continuous amount information A in the form of a binary code to a Gray code by performing an operation. Specifically, the microcomputer 11 performs an exclusive-OR operation by using the continuous amount information A and information A', which is generated by shifting the information A to the right by 1 bit, so as to generate a Gray code, and stores the Gray code as continuous amount information B (STEP 9). For example, continuous amount information A "0110" is converted to continuous amount information B "0101".

After a burst period, the microcomputer 11 starts to transmit data to the tablet. That is, the microcomputer 11 controls the terminal P3 in accordance with a value (binary number) of the continuous amount information B from a lower bit in synchronization with a rising edge of a signal from the terminal P0, which is a synchronization signal from the tablet, so as to transmit the data to the tablet (STEP 10).

For example, assume that information "0101" has been obtained as continuous amount information B. When the information is transmitted from a lower bit, a first bit is "1". Therefore, by detecting a synchronization signal from the tablet, the microcomputer 11 controls the terminal P3 to turn ON the switch 2, so that the resonant circuit 1 is shorted. Accordingly, a signal in the resonant circuit 1 is interrupted and the tablet detects this state. As a result, "1" is transmitted. Then, since the second bit is "0", the microcomputer 11 does nothing in response to a synchronization signal from the tablet. Accordingly, the signal in the resonant circuit 1 is kept therein and the tablet detects this state. As a result, "0" is transmitted. Incidentally, after being turned ON, the switch 2 is turned OFF after a predetermined time period (time period having no influence on the next bit, e.g., 100 μs) by the microcomputer 11 or an appropriate external circuit.

After transmitting all bits to the tablet in the above-described manner, the microcomputer 11 waits for a next burst period and starts a process of detecting a writing pressure again.

In the above-described embodiment, STEPs 3 to 8 are performed by the above-described time constant circuit and the coding unit mentioned in the Summary of the Invention, and STEP 9 is performed by the code converting unit mentioned in the summary. The coding unit and the code converting unit form the digital information generator. STEP 10 is performed by the switch 2 and the resonance characteristic controller mentioned in the summary.

Although a microcomputer is used in the above-described embodiment, a combination of logic circuits may be used. Also, the counter inside the microcomputer may count clock signals of the microcomputer.

The tablet used in the embodiment is not specified and any type of tablet may be used as long as it has a configuration for detecting information of an operation as a signal level based on signals from a position indicator. For example, a configuration disclosed in a first embodiment of Japanese Unexamined Patent Application Publication No. 8-171448 and a configuration disclosed in Japanese Unexamined Patent Application Publication No. 8-30374 may be used.

The present invention may be applied to various measuring sensor circuits and tags for merchandise management or prevention of shoplifting, as well as to a position indicator for a digitizer.

What I claim is:

1. A position indicator for a digitizer tablet comprising:
   a resonant circuit;
   a power extracting circuit for extracting power for driving each component from an induced voltage which is generated in the resonant circuit due to externally transmitted electromagnetic waves;
   a digital information generator for detecting analog information and generating digital information which corresponds to the analog information and which includes a binary code of two bits or more; and
   a resonance characteristic controller for bringing the resonant circuit into a short-circuited state in accordance with any one of '0' and '1' of the binary code in synchronization with at least part of the electromagnetic waves,
   wherein, by transmitting the digital information including the binary code, only one bit of the binary code changes when the corresponding analog information changes, a variation in the power supply voltage is suppressed and the analog information can be stably detected by the digitizer tablet.

2. The information transmitting device according to claim 1, wherein a Gray code is used as the binary code.

3. The information transmitting device according to claim 2, wherein the digital information generator comprises:
   coding means for converting the analog information to a binary code; and
   code converting means for converting the binary code to a Gray code.

4. The information transmitting device according to claim 3, wherein the coding means converts the analog information to a time period and generates a binary code by counting AC signals having a predetermined frequency during the time period.

5. A method of operating an input device for a digitizer tablet comprising the steps of:
   providing a digitizer tablet and an input device having a resonant circuit;
   providing a power extracting circuit for extracting power for driving each component from an induced voltage which is generated in the resonant circuit due to externally transmitted electromagnetic waves;
   providing a digital information generator for detecting analog information and generating digital information which corresponds to the analog information and which includes a binary code of two bits or more; and
   proving a resonance characteristic controller for bringing the resonant circuit into a short-circuited state in accordance with any one of '0' and '1' of the binary code in synchronization with at least part of the electromagnetic waves, wherein, by transmitting the digital information including the binary code, only one bit of the binary code changes when the corresponding analog information changes, a variation in the power supply voltage is suppressed and the analog information is stably detected by the digitizer tablet.

* * * * *